United States Patent
Azad et al.

(10) Patent No.: US 12,406,514 B2
(45) Date of Patent: Sep. 2, 2025

(54) GENERATION OF TRAINING MATERIALS FOR OPTICAL CHARACTER RECOGNITION

(71) Applicant: The Boeing Company, Chicago, IL (US)

(72) Inventors: Ali Azad, Kirkland, WA (US); David D. Pokrajac, Everett, WA (US)

(73) Assignee: THE BOEING COMPANY, Arlington, VA (US)

(*) Notice: Subject to any disclaimer, the term of this patent is extended or adjusted under 35 U.S.C. 154(b) by 654 days.

(21) Appl. No.: 17/747,584

(22) Filed: May 18, 2022

(65) Prior Publication Data

US 2023/0377360 A1 Nov. 23, 2023

(51) Int. Cl.
*G06V 30/19* (2022.01)
*G06V 30/40* (2022.01)

(52) U.S. Cl.
CPC .. *G06V 30/19147* (2022.01); *G06V 30/19013* (2022.01); *G06V 30/19093* (2022.01); *G06V 30/40* (2022.01)

(58) Field of Classification Search
CPC .......... G06T 2207/20081; G06V 30/40; G06V 30/41; G06V 30/00; G06V 30/19146; G06V 20/19153
See application file for complete search history.

(56) References Cited

U.S. PATENT DOCUMENTS

| | | | |
|---|---|---|---|
| 11,176,443 B1 | 11/2021 | Selva et al. | |
| 2017/0024633 A1* | 1/2017 | Negro | G06V 30/1914 |
| 2018/0096200 A1 | 4/2018 | Krivopaltsev et al. | |
| 2019/0213408 A1* | 7/2019 | Cali | G06V 30/414 |
| 2019/0311227 A1* | 10/2019 | Kriegman | G06V 30/19173 |
| 2020/0125595 A1* | 4/2020 | Truong | G06F 40/205 |
| 2021/0319246 A1 | 10/2021 | Xu | |
| 2021/0365836 A1 | 11/2021 | Wilkins | |

OTHER PUBLICATIONS

Python, "Welcome to Python.org"; Retrieved from the internet: URL: https://www.python.org/ [retrieved on May 18, 2022]; pp. 1-3.
Pillow, "Pillow (PIL Fork)", Retrieved from the internet: URL: https://pillow.readthedocs.io/en/stable/ [retrieved on May 18, 2022]; pp. 1-5.
Home-Opencv, "OpenCV AI Game Show", Retrieved from the internet: URL: https://opencv.org [retrieved on May 18, 2022]; pp. 1-10.
Scikit-Image, "Image processing in Python", Retrieved from the internet: URL: https://scikit-image.org/; pp. 1-2.

* cited by examiner

*Primary Examiner* — Molly Wilburn

(74) *Attorney, Agent, or Firm* — COATS & BENNETT, PLLC (57) ABSTRACT

The application is directed to the generation of training materials for optical character recognition. Generating the training materials for optical character recognition can include selecting a plurality of terms that include a string of characters. For each term, generating multiple digital term images that each includes the term with a different visual appearance. For generation of a training document, the method includes positioning the term images on a digital background and generating the digital training material.

20 Claims, 10 Drawing Sheets

GENERATION OF TRAINING MATERIALS FOR OPTICAL CHARACTER RECOGNITION

TECHNOLOGICAL FIELD

The present disclosure relates generally to the field of optical character recognition and, more specifically to the generation of training materials for optical character recognition to recognize terms.

BACKGROUND

Optical Character Recognition (OCR) is a process that recognizes characters in printed or handwritten documents. An OCR system includes both hardware and software to provide for the character recognition. Hardware initially converts the documents into a digital image, such as by scanning or otherwise reproducing the document. Software analyzes the image and differentiates dark and light regions. The dark regions are further analyzed to identify individual characters.

One method of identifying the individual characters uses a training process by which a range of language, text formats, handwriting, and spacings are used to train the software. Once trained, the software compares the identified characters from the digital image with the training materials to find matches and correctly identify the characters.

The OCR software is more accurate when trained using a wide variety of materials. For example, the training materials can include images of characters as they may be encountered during the recognition process, including documents that were printed with fuzzy characters, documents with poor contrast between the characters and the background, letters and words that overlap, and documents with noise (e.g., visible in form of dots, ink or irregular spots, stamps, traces of mold, food and drink stains) that extends over the characters.

Current methods require a manual process to generate training materials. A technician is provided a series of images that contain scanned text documents with sufficiently high resolution. The documents may contain one or more of text, form templates (headers, memos, repeated tabular structures, horizontal or vertical lines), stamps, as well as noise. The text itself may come in various forms, including text from a printer (e.g., matrix printer, ink jet, laser printer), text from a mechanical printer or typewriter that can vary in consistency, contrast, shape, and handwritten text. The technician uses a mouse to indicate a bounding box of each text segment such as a word. After the box is specified, the technician types the text using a computer keyboard over the box. This process provides for segmentation where the part of the image corresponding to a text segment is identified and stored and also provides for including an association with the textual meaning which is stored in terms of ASCII (i.e., a standardized computer representation of the text). The pairing of the textual segments and the associated textual meaning provides for training of the OCR software.

An issue with this process is that the manual annotation is time-consuming. In one example, a technician takes about thirty (30) minutes to annotate a single page of text. Another issue is the manual annotation is demanding on the technician. This can lead to fatigue and errors in the training materials which in turn lead to errors by the OCR software.

SUMMARY

One aspect is directed to a method of generating digital training materials for optical character recognition. The method comprises: selecting a plurality of terms that each comprise a string of characters; for each term, generating multiple digital term images that each comprises the term with a different visual appearance; and positioning the term images on a digital background and generating the digital training material.

In another aspect, the plurality of terms comprises words.

In another aspect, the method further comprises: receiving a digital image of a document; comparing a visual appearance of one or more terms in the document with stored text styles; determining one or more text styles from the stored text styles that has a visual appearance similar to the visual appearance of the one or more terms; and generating the term segments using the one or more text styles from the stored text styles.

In another aspect, the method further comprises selecting the one or more text styles from the stored text styles based on a statistical similarity with the visual appearance of the one or more terms in the document.

In another aspect, determining one or more text styles from the stored text styles comprises determining one or more fonts from the stored text styles that have a visual appearance similar to the visual appearance of the one or more terms.

In another aspect, the method further comprises copying a section of a digital image of a document and generating the background.

In another aspect, generating the term images further comprises adding noise to one or more of the term images.

In another aspect, generating the multiple term images further comprises visually distorting one or more of the term images.

In another aspect, the method further comprises positioning combinations of the term images together in an end-to-end arrangement on the background and forming phrases on the digital background.

In another aspect, the method further comprises after positioning the term images on the background, adding noise to the term images.

In another aspect, the method further comprises generating a document that comprises a single one of the backgrounds and a plurality of the term images.

One aspect is directed to a method of generating training material for optical character recognition. The method comprises: determining a text style of terms of a document; selecting a plurality of stored text styles from a storage bank with the plurality of stored text styles having a similar visual appearance with the text style of the terms of the document; determining a list of terms with each of the terms comprising one or more characters; for each of the terms of the list of terms, generating term images comprising the term in the plurality of stored text styles; and for one or more of the term images, positioning the term images on a digital background that matches the document.

In another aspect, the method further comprises positioning the term images at different locations on the background and generating a training document.

In another aspect, selecting the stored text styles comprises selecting the stored text styles based on a similarity in visual appearance between the stored text styles and the text style of the document.

In another aspect, selecting the stored text styles comprises selecting fonts based on a similarity in visual appearance between fonts from the stored text styles and a font of the document.

In another aspect, selecting the stored text styles comprises selecting the stored text styles based on a statistical similarity between the text style of the document and the stored text styles.

In another aspect, the method further comprises copying a section of the document and generating the background.

One aspect is directed to a computing device comprising memory circuitry having a text style bank, and processing circuitry. The processing circuitry is configured to: determine a text style of a document; select a plurality of text styles from the text style bank with the plurality of text styles having a similar visual appearance with the text style of the document; determine a list of terms with each of the terms comprising one or more characters; for each of the terms of the list of terms, generate a plurality of term images comprising the term in the plurality of text styles; and for one or more of the term images, position the term images on a digital background that matches the document.

In another aspect, the processing circuitry is further configured to determine the list of terms from the document.

In another aspect, the processing circuitry is further configured to generate a training document comprising the background and one or more of the term images.

The features, functions and advantages that have been discussed can be achieved independently in various aspects or may be combined in yet other aspects, further details of which can be seen with reference to the following description and the drawings.

DETAILED DESCRIPTION

The present application is directed to generating training materials for training for optical character recognition (OCR). The training materials include one or more terms and documents. The OCR software identifies the terms and correlates the identification to the corresponding definition of the term. The training materials can be in digital format or can be printed to a hard copy when used for training an OCR system.

Figure 1A:
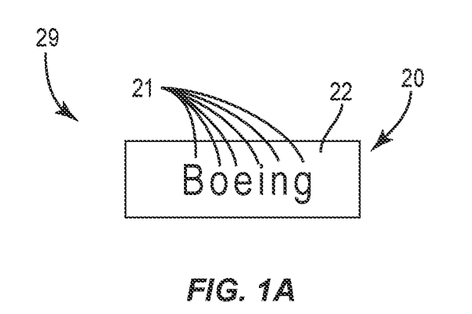
FIG. 1A is a diagram of a term image.
Figure 1B:
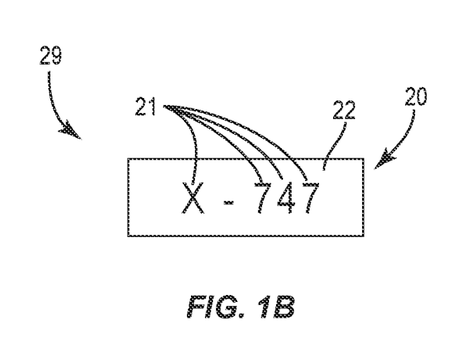
FIG. 1B is a diagram of a term image.

FIGS. 1A and 1B illustrate examples of training materials 29 including term images 20. Each term image 20 is a word, number, symbol, etc. that could be encountered during the OCR process. The term images 20 include one or more characters 21 that are positioned on a background 22. The characters 21 can have various text styles with different visual appearances due to one or more different alphabets, fonts, numbering systems, languages, print styles (e.g., typed, hand-written), capitalizations, and spacing. The background 22 can further include various visual appearances. In one example, the background 22 is clean with no markings. In another example, the background 22 is obtained from a section of a scanned document and has a visual appearance of the document to replicate what will be encountered during the OCR process.

Figure 2:
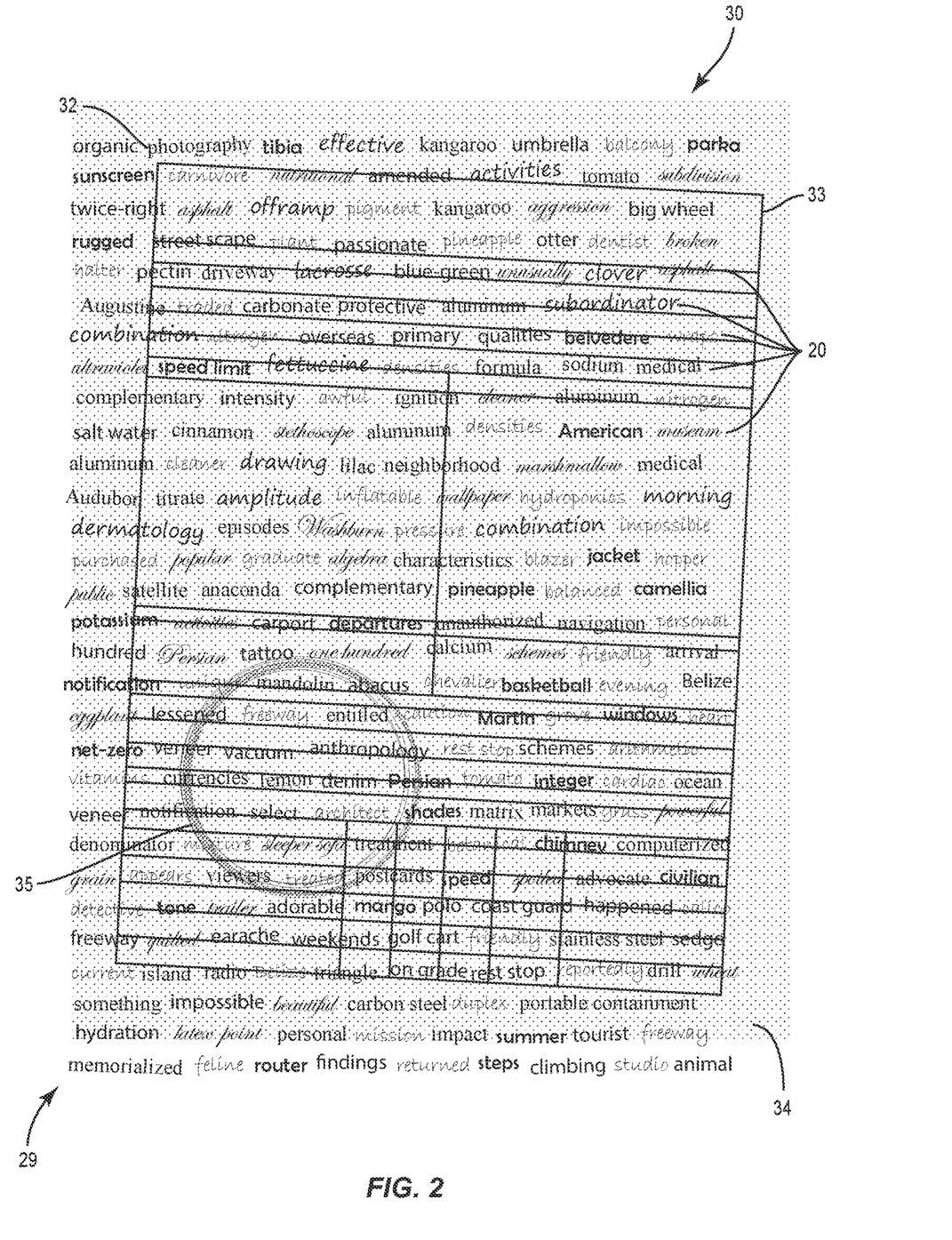
FIG. 2 is a diagram of a training document.

Training materials 29 can also include training documents 30 that include one or more of the term images 20. FIG. 2 illustrates a training document 30 that includes term images 20 positioned at various locations and orientations. The term images 20 can be isolated, or can be arranged in a grouping and can form sentences, phrases, etc. The term images 20 within a training document 30 can have the same or different visual appearance. FIG. 2 includes term images 20 with different sizes, orientations, and fonts.

The training document 30 further includes a background 32 on which the term images 20 appear. The background 32 can include various visual appearances and can replicate the visual appearance of a document that will be encountered during the OCR process. The background 32 can include various aspects, including but not limited to grid/table lines 33 and shaded areas 34. Noise 35 can be added to the document 30 to provide a more realistic aspect to the document as it will be encountered during the OCR process.

Figure 3:
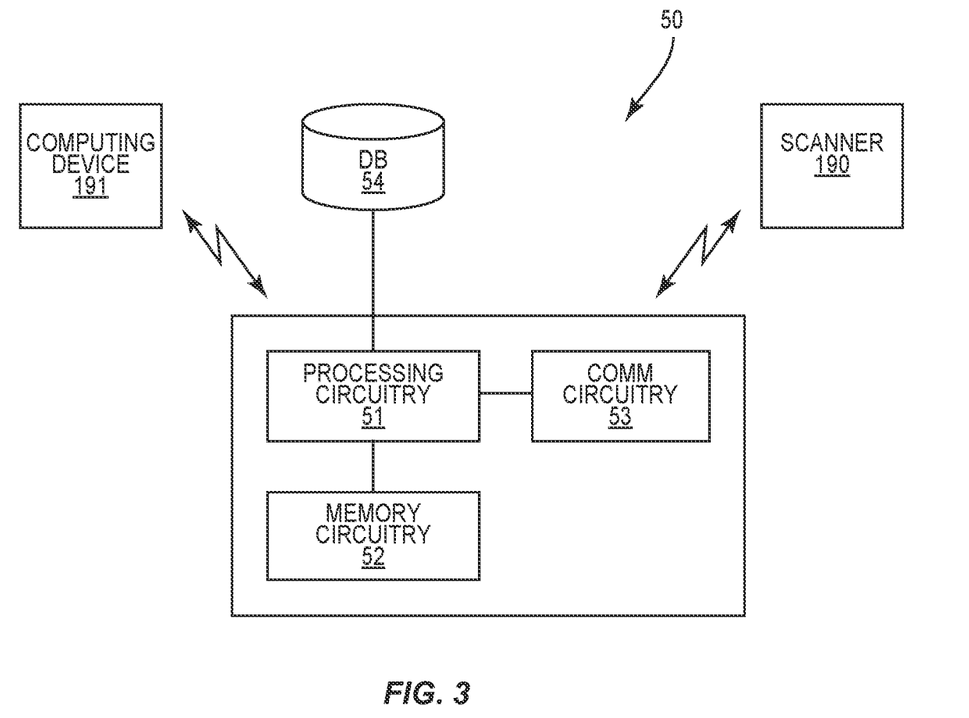
FIG. 3 is a schematic diagram of a computing device.

FIG. 3 illustrates a computing device 50 configured to generate the training materials 29. The computing device 50 includes processing circuitry 51 and memory circuitry 52. The processing circuitry 51 includes one or more circuits, microcontrollers, microprocessors, hardware, or a combination thereof. Memory circuitry 52 includes a non-transitory computer readable storage medium storing program instructions, such as a computer program product, that configures the processing circuitry 51 to implement one or more of the techniques discussed herein. Memory circuitry 52 can include various memory devices such as, for example, read-only memory, and flash memory. Memory circuitry 52 can be a separate component as illustrated in FIG. 3 or can be incorporated with the processing circuitry 51. Additionally or alternatively, data can be stored in one or more databases 54. The databases 54 include a non-transitory computer readable storage medium (e.g., an electronic, magnetic, optical, electromagnetic, or semiconductor system-based storage device). The databases 54 can be local or remote relative to the computing device 50.

Computing device 50 can also include communications circuitry 53 to send and receive data to and from remote sources. Examples include but are not limited to scanned images of a document from a scanning device 190 and remote computing devices 191. Computing device 50 can also receive a document as a photo, and as subtitle text superimposed on an image.

The memory circuitry 52 stores various data to generate the training materials 29. The data can be received from a remote source, such as a scanning device 190 or computing device 191. The data can also be previously stored in the memory circuitry 52 and/or database 54.

Figure 4:
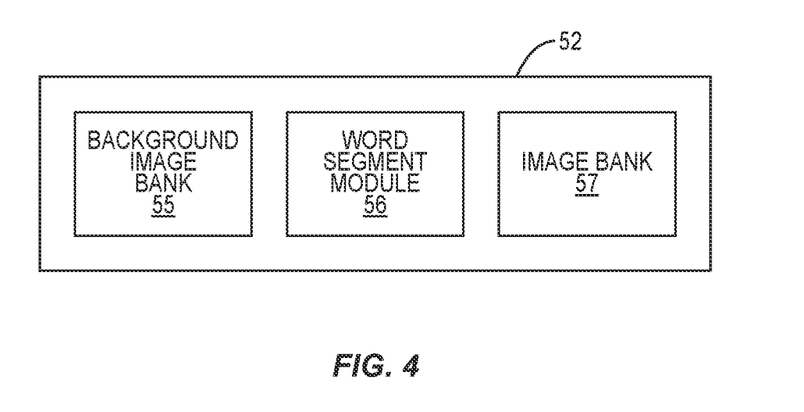
FIG. 4 is a schematic diagram of data that is stored with the computing device.

FIG. 4 illustrates data that is used to generate the term images 20 and training documents 30. FIG. 4 includes the data stored at the memory circuitry 52. The data can also be stored at the database 54. Background images 55 includes a section or entirety of documents used as backgrounds for the term images 20 and training documents 30. The background images 55 have the same visual appearance as these documents. In one example, the background images 55 are obtained from a scanning device 190 that scans examples of documents 60 that are to be encountered during the OCR process.

Word segments 56 include words that are encountered during the OCR process. The word segments 56 can include various words, including but not limited to a listing of common words, a list of technical terms, medical terms, legal terms, etc. The word segments 56 are words that are expected to be encountered during the OCR process. The word segment 56 can be supplemented by the processing circuitry 51, such as when a new word is encountered during the training process. In one example, a new term is encountered in a scanned document 60. The new term is added to the storage bank and a corresponding identification of the term is associated with the term.

An image bank 57 includes the different text styles that affect the visual appearance of the term images. Image bank 57 can include data corresponding to various aspects, including but not limited to different languages, fonts, capitalizations, and alphabets.

Figure 5:
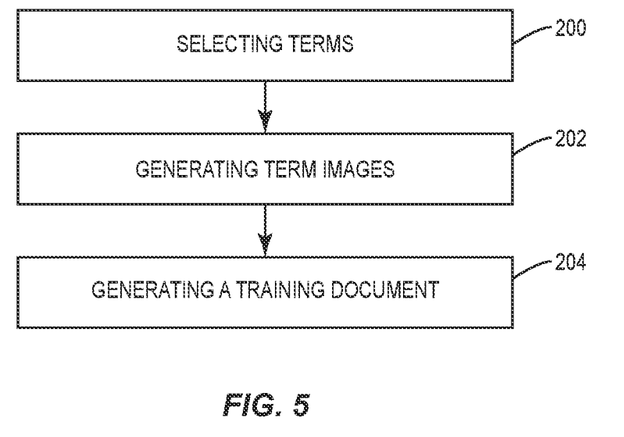
FIG. 5 is a flowchart diagram of a method of generating term images and training documents.

FIG. 5 illustrates a method of generating training materials 29 including term images 20 and/or training documents 30. One or more terms are selected (block 200). The terms can be from a document, or can be received from a user, such as from a remote computing device 191. The terms are generated into digital term images 20 (block 202). When a training document 30 is to be generated, one or more term images 20 are used to generate the training document 30 (block 204).

Figure 6:
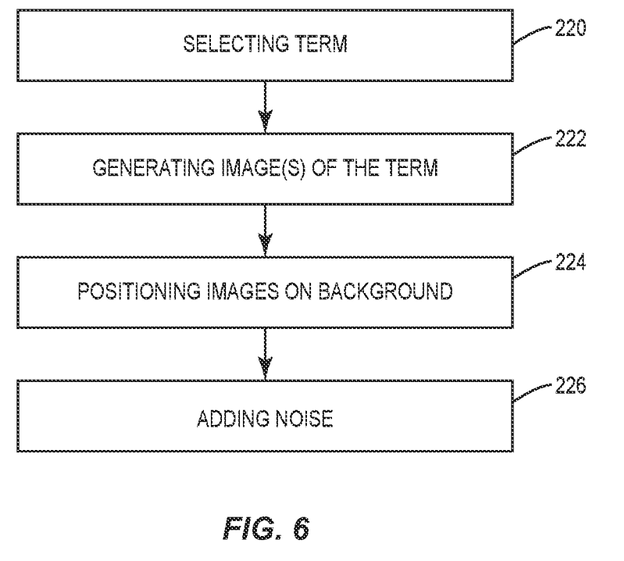
FIG. 6 is a flowchart diagram of a method of generating term images.

FIG. 6 illustrates a method of generating digital term images 20. Initially, a term is selected (block 220). The term includes one or more alphanumeric characters. In one specific example, the selected term is "test". The term can be selected from the word segment bank 56. In another example, the term was selected from a scanned document that was received by the computing device 50.

Figure 7:
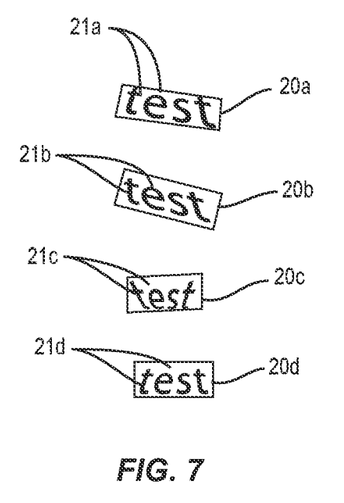
FIG. 7 is a diagram of term images.

The computing device 50 generates one or more digital images of the term (block 222). In one example, the different digital images have unique visual appearances caused by different text styles, such as but not limited to one or more different fonts, skewing, and distortion. FIG. 7 illustrates an example of four separate term images 20a-20d of the term "test". Each of the term images 20a-20d has a different visual appearance due to the differences in the text styles of the characters 21a-21d.

Figure 8:
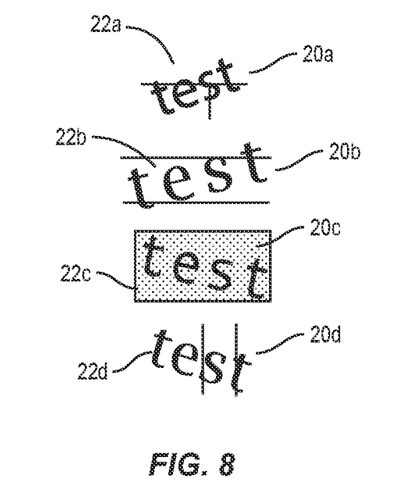
FIG. 8 is a diagram of term images that include background images.

The term images 20 can further be overlayed on background images 22 (block 224). The term images 20 can be oriented on the background images 22 at various angular positions to provide variety amongst the different terms. FIG. 8 includes four term images 20a-20d that have been overlayed on different background images 22a-22d.

Noise can be added to one or more of the images (block 226). Noise includes one or more of shading, lines, staining, etc. to recreate the visual appearance of the term within a document. The noise further recreates the visual appearance of a document that will be encountered during the OCR process. In another example, noise is not added to the term image 20.

Figure 9:
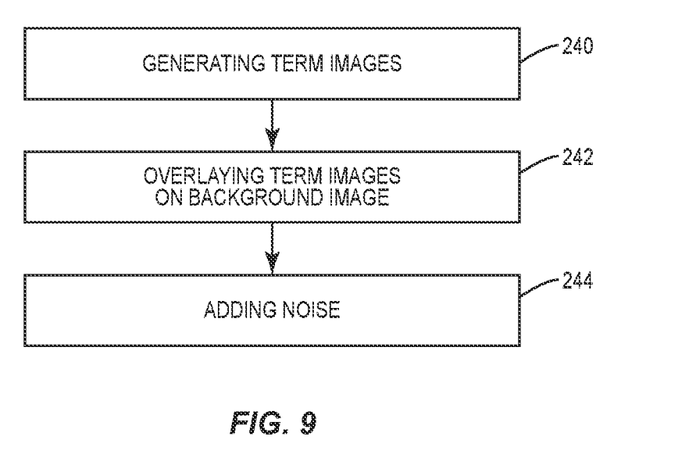
FIG. 9 is a flowchart diagram of a method of generating a training document.
Figure 10:
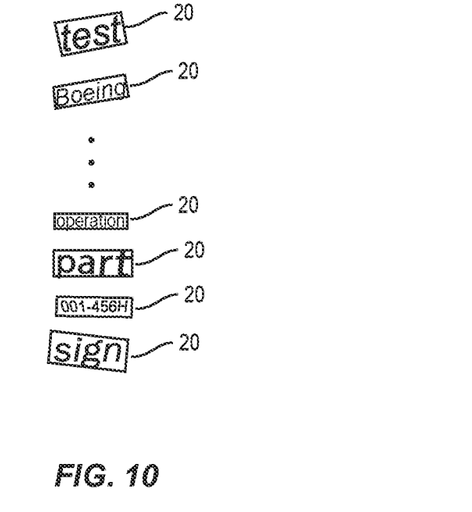
FIG. 10 is a diagram of term images.

FIG. 9 illustrates a method of generating a training document 30. The method includes generating digital term images 20 (block 240). FIG. 10 illustrates an example of different term images 20 including a variety of different terms. The term images 20 can include the same or different visual appearance due to one or more different fonts, backgrounds, noise, etc.

Figure 11:
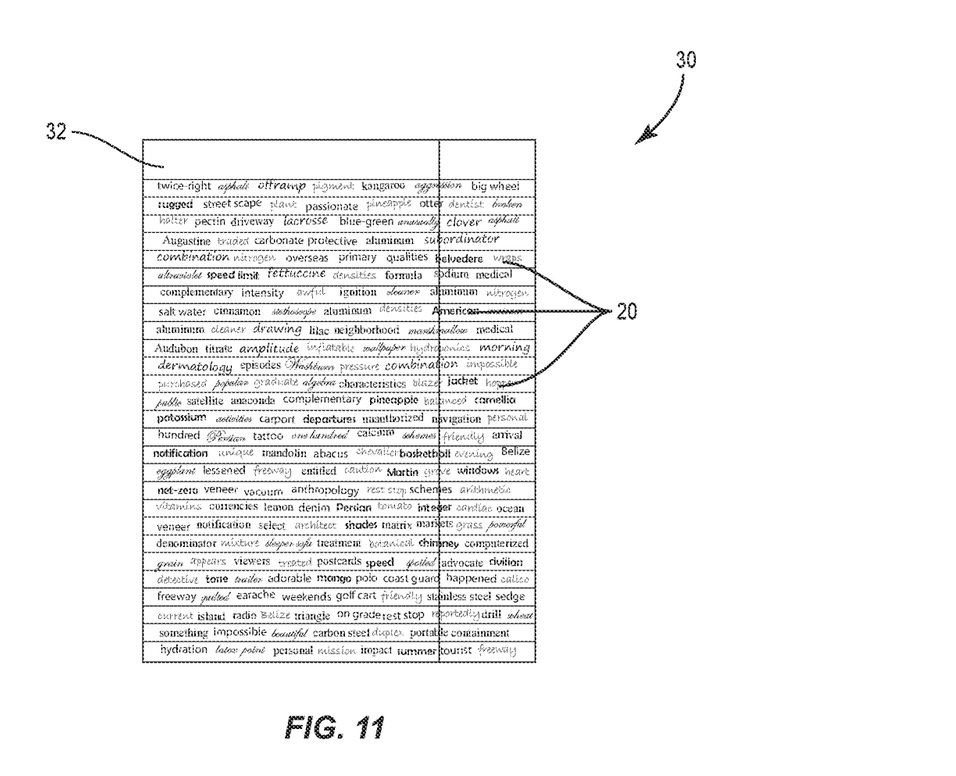
FIG. 11 is a diagram of a training document.

The one or more term images 20 are overlayed on a background image 32 (block 242). The background image 32 can include various sizes and formats. FIG. 11 includes a background image 32 that includes horizontal and vertical lines and is visually similar to notebook paper. The term images 20 are positioned on the background image 32 at various locations and orientations. Noise can be further added to complete the training document 30 (block 244). In another example, the training document 30 does not include noise.

Figure 12:
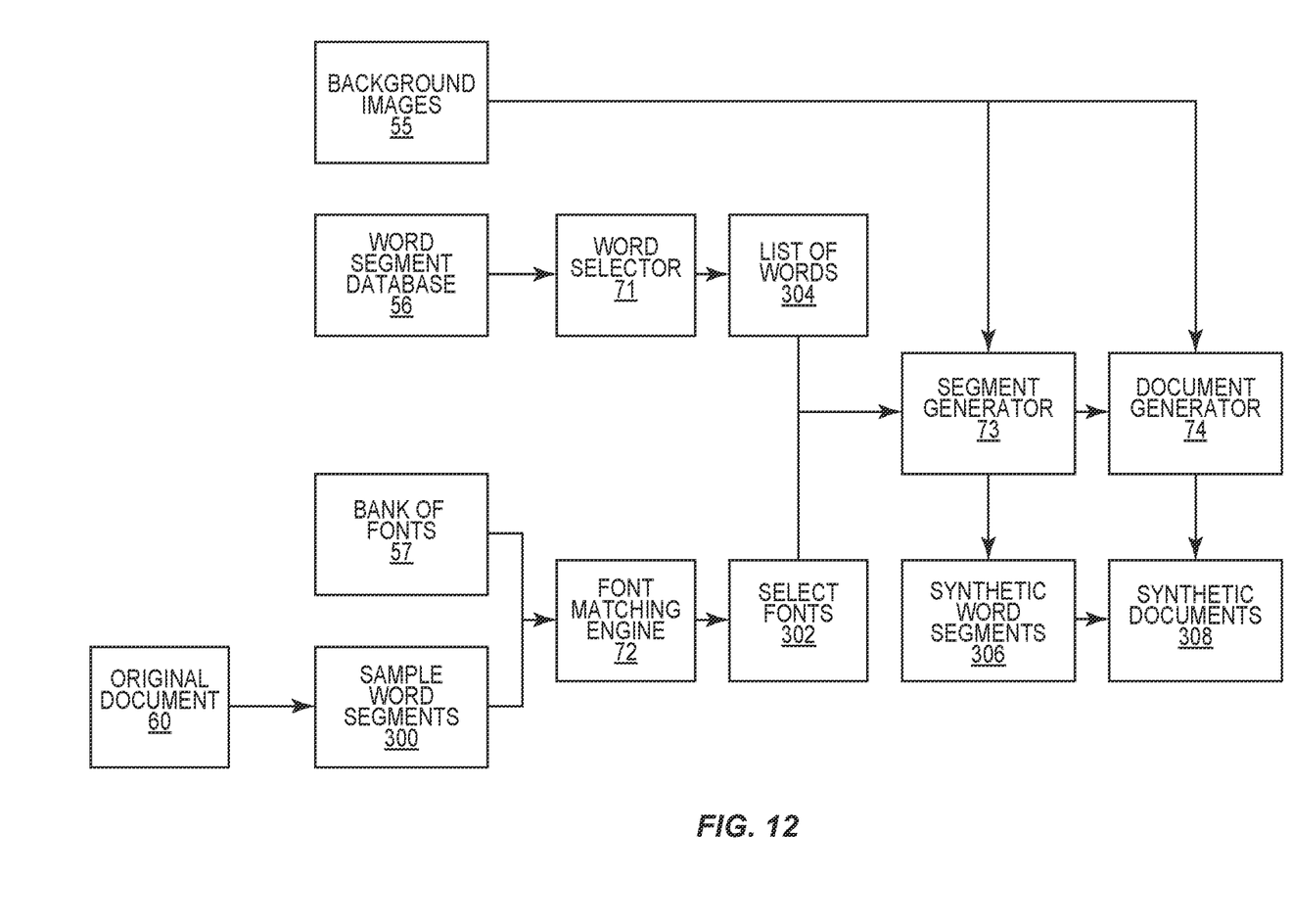
FIG. 12 is a schematic diagram of a process flow for generating term images and training documents.

FIG. 12 illustrates a work process for a computing device 50 to generate term images 20 and training documents 30. The computing device 50 replicates terms as they appear in an original document 60. Word segments are selected from the original document 60 (block 300). The word segments can be manually selected and sent to the computing device 50, or the computing device 50 can analyze a digital version of the original document and select the terms. In one specific example, the computing device 50 receives a scanned version of the original document 60 from a scanner 190.

Figure 13:
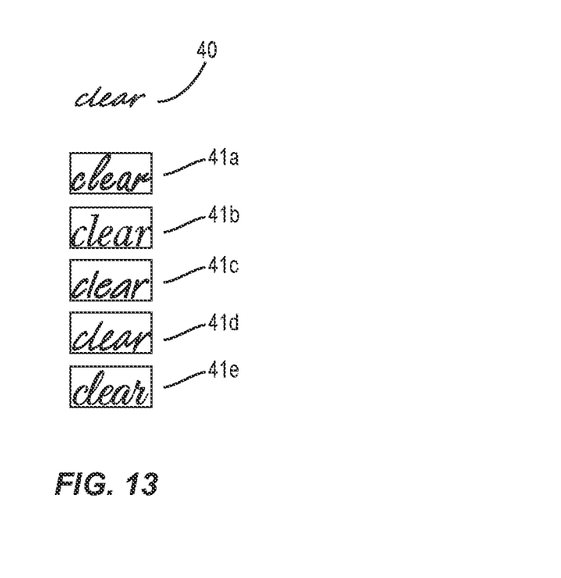
FIG. 13 is a diagram of terms appearing in different fonts and ranked according to a visual similarity with a word segment.

The visual appearance of the word segments is compared to characteristics stored in the image bank 57. In one example, this includes ranking the word segment with similar text styles from the image bank 57. FIG. 13 includes an example in which a word segment 40 is selected from the original document 60. The computing device ranks text styles from the image bank 57 that provide a similar visual appearance. For example, a first font provides for a font sample 41a that has the most similar visual appearance to the word segment 40. A second font provides a second font sample 41b with the second most similar visual appearance. Additional font samples 41c-41e are created and compared to provide for a ranking that provides for similar visual appearances. The computing device 50 then selects the one or more text styles that provide for the closest visual appearance to the word segment 40 (block 302).

Figure 14:
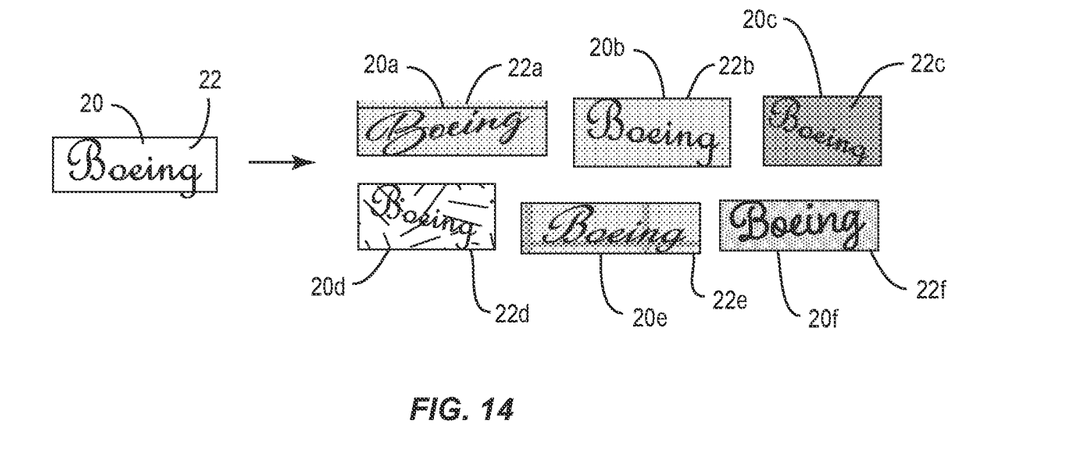
FIG. 14 is a diagram of term images each having a different visual appearance.

The computing device 50 can determine visually similar text styles in various manners. In one example, the computing device 50 analyzes features and shapes of characters of the characters and looks for similarities. This can include similarities in open areas, shapes of sections of a character. Another example includes pattern matching in which a comparison is made on a pixel-by-pixel basis. Another example includes a feature extraction system in which aspects, such as closed loops or intersections of lines are extracted and analyzed. The number and/or extent of similarities provides for ranking the different text styles. In another The computing device 50 further determines a list of words to generate as term images 20 (block 304). The list of words can be selected by the computing device 50 from the word segment bank 56. The computing device 50 generates the selected words using the selected fonts to generate the term images 20 (block 306). The number of term images 20 that are generated is based on the number of selected words and the number of selected fonts. FIG. 14 includes an example in which term images 20-20f are generated for the term "Boeing". The term images 20-20f include different visual appearance that each has a visual resemblance to the term that would appear in a document that is analyzed during an OCR process. The computing device 50 can further use back images 22 from the background image bank 55 to generate the term images 20. In this example, seven term images 20-20f are created with different fonts and with a variety of different background images 22-22f.

In addition to term images 20, training documents 30 are generated (block 308). The training documents 30 include one or more of the term images 20 that are positioned on a background image 32 selected from the background image bank 55.

Figure 15:
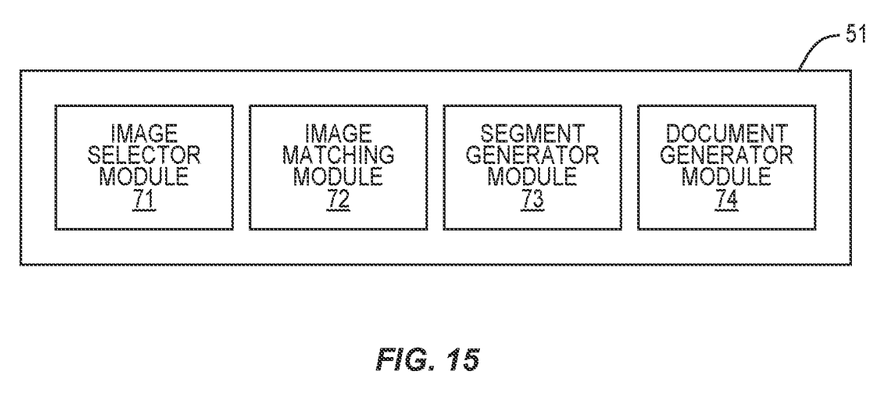
FIG. 15 is a schematic diagram of modules of a processing circuitry.

FIG. 15 illustrates functional modules of the processing circuitry 51 for generating the training materials 29. An image selector module 71 determines the images that are to be generated into term images 20. The images can include words, numbers, or symbols that would be encountered during an OCR process. An image matching module 72 matches the term with similar visual aspects that are stored at the computing device 50. In one example as illustrated in FIG. 12, the image matching module 72 ranks the visual similarities of fonts. In another example, the image matching module compares the similarities of hand-written images. A segment generator module 73 generates the term images 20 that include one or more characters 21 and background 22. A document generator module 74 generates the training documents 30 that include one or more term images 20, and a background 32. One or both of the segment generator module 73 and document generator module 74 can further include noise in the generated images.

In another example, the modules 71-74 are program instructions that are stored in the memory circuitry 52 and configured to be run by the processing circuitry 51 to perform the desired functions.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of generating digital training materials for optical character recognition, the method comprising:
    selecting a plurality of terms that each comprise a string of characters;
    for each term, generating multiple term images that are digital and that each comprises the term with a different visual appearance; positioning the term images on a background that is digital; and
    generating a document that comprises the background and a plurality of the term images.

2. The method of claim 1, wherein the plurality of terms comprises words.

3. The method of claim 1, further comprising:
    receiving a digital image of a document;
    comparing a visual appearance of one or more terms in the document with stored text styles;
    determining one or more text styles from the stored text styles that has a visual appearance similar to the visual appearance of the one or more terms; and
    generating the term images using the one or more text styles from the stored text styles.

4. The method of claim 3, further comprising selecting the one or more text styles from the stored text styles based on a statistical similarity with the visual appearance of the one or more terms in the document.

5. The method of claim 3, wherein determining one or more text styles from the stored text styles comprises determining one or more fonts from the stored text styles that have a visual appearance similar to the visual appearance of the one or more terms.

6. The method of claim 1, further comprising copying a section of a digital image of a document and generating the background.

7. The method of claim 1, wherein generating the term images further comprises adding noise to one or more of the term images.

8. The method of claim 1, wherein generating the term images further comprises visually distorting one or more of the term images.

9. The method of claim 1, further comprising positioning combinations of the term images together in an end-to-end arrangement on the background and forming phrases on the background.

10. The method of claim 1, further comprising after positioning the term images on the background, adding noise to the term images.

11. The method of claim 1, further comprising generating the background with one or more grid/table lines and shaded areas.

12. A method of generating training material for optical character recognition, the method comprising:
    determining a text style of terms of a document;
    selecting a plurality of stored text styles from a storage bank with the plurality of stored text styles having a visual appearance that matches the text style of the terms of the document;
    determining a list of terms with each of the terms comprising one or more characters;
    for each of the terms of the list of terms, generating term images comprising the term in the plurality of stored text styles; and
    for one or more of the term images, positioning the term images at different locations on a background that is digital and that matches the document; and
    generating a training document.

13. The method of claim 12, wherein selecting the stored text styles comprises selecting the stored text styles based on a similarity in visual appearance between the stored text styles and the text style of the document.

14. The method of claim 12, wherein selecting the stored text styles comprises selecting fonts based on a similarity in visual appearance between fonts from the stored text styles and a font of the document.

15. The method of claim 12, wherein selecting the stored text styles comprises selecting the stored text styles based on a statistical similarity between the text style of the document and the stored text styles.

16. The method of claim 12, further comprising copying a section of the document and generating the background.

17. The method of claim 12, further comprising positioning the term images at different orientations on the background.

18. A computing device comprising:
    memory circuitry having a text style bank; and
    processing circuitry configured to:
        determine a text style of a document;
        select a plurality of text styles from the text style bank with the plurality of text styles having a similar visual appearance with the text style of the document;

determine a list of terms with each of the terms comprising one or more characters;

for each of the terms of the list of terms, generate a plurality of term images comprising the term in the plurality of text styles;

for one or more of the term images, position the term images on a background that is digital and that matches the document; and generate a training document comprising the background and one or more of the term images.

19. The computing device of claim 18, wherein the processing circuitry is further configured to determine the list of terms from the document.

20. The computing device of claim 18, wherein the processing circuitry is configured to position the term images at different locations and orientations on the background.

\* \* \* \* \*